United States Patent
Kaye, III (10) Patent No.: US 9,495,703 B1
(45) Date of Patent: Nov. 15, 2016

(54) AUTOMATIC BUDGETING SYSTEM

(71) Applicant: Frances J. Kaye, III, North Canton, OH (US)

(72) Inventor: Frances J. Kaye, III, North Canton, OH (US)

( * ) Notice: Subject to any disclaimer, the term of this patent is extended or adjusted under 35 U.S.C. 154(b) by 0 days.

(21) Appl. No.: 14/152,148

(22) Filed: Jan. 10, 2014

Related U.S. Application Data (60) Provisional application No. 61/751,365, filed on Jan. 11, 2013.

(51) Int. Cl.
*G06Q 40/00* (2012.01)

(52) U.S. Cl.
CPC ..................................... *G06Q 40/00* (2013.01)

(58) Field of Classification Search
USPC ........................................ 705/35, 39, 40, 38
See application file for complete search history.

(56) References Cited

U.S. PATENT DOCUMENTS

| | | | |
|---|---|---|---|
| 6,343,279 B1 | 1/2002 | Bissonette et al. | |
| 7,707,105 B2 | 4/2010 | O'Neil | |
| 8,060,411 B2 | 11/2011 | Shestakov et al. | |
| 8,768,801 B1* | 7/2014 | Cheatham ....................... | 705/35 |
| 2005/0197918 A1* | 9/2005 | Wittmer et al. ................ | 705/26 |
| 2010/0190471 A1* | 7/2010 | Smith .......................... | 455/408 |
| 2011/0029416 A1* | 2/2011 | Greenspan ..................... | 705/30 |
| 2012/0171990 A1* | 7/2012 | Williams et al. ............. | 455/406 |
| 2012/0190386 A1* | 7/2012 | Anderson ................... | 455/456.3 |
| 2012/0197793 A1 | 8/2012 | Grigg et al. | |
| 2012/0330769 A1* | 12/2012 | Arceo ............... | G06Q 20/4014 705/21 |
| 2013/0036047 A1* | 2/2013 | Busher ........................... | 705/41 |
| 2013/0103580 A1* | 4/2013 | Ventura ......................... | 705/40 |
| 2013/0256403 A1* | 10/2013 | MacKinnon Keith ........ | 235/375 |
| 2014/0136365 A1* | 5/2014 | Nista .......................... | 705/26.8 |
| 2016/0086151 A1* | 3/2016 | Xia ....................... | G06Q 20/02 705/71 |

* cited by examiner

*Primary Examiner* — Lalita M Hamilton
(74) *Attorney, Agent, or Firm* — Tarolli, Sundheim, Covell & Tummino LLP (57) ABSTRACT

Provided is a software application containing instructions to receive an identifier associated with an item to be purchased by a user. The software application provides the identifier associated with the item to an associated database. The item is then assigned a classification which, along with the price of the item, is provided to an authorization entity associated with at least one account of the user. A notice is then received as to whether a purchase of the item using the account will be authorized at the time of purchase. The authorization is determined as a function of the price of the item and the classification of the item.

12 Claims, 7 Drawing Sheets

FIG. 1

| BUCKET | ALLOCATED AMOUNT | TIMEFRAME | OVERRIDE AVAILABLE? | BALANCE |
|---|---|---|---|---|
| SAVINGS GOAL | 1,000 | MONTHLY | YES | 850 |
| FOOD PRODUCTS | 300 | MONTHLY | YES | 150 |
| CLOTHING | 300 | ANNUALLY | NO | 100 |
| ENTERTAINMENT | 100 | MONTHLY | NO | 20 |
| GAS | 50 | WEEKLY | YES | 50 |

FIG. 2

CREATE/MODIFY BUCKET RULES

| CLASSIFICATION | ENTERTAINMENT | PENALTY FOR AUTHORITY | |
|---|---|---|---|
| AMOUNT | $ 0.00 | $20.00 TO SAVINGS | $20.00 PERMANENT REDUCTION IN CLASSIFICATION ALLOTMENT |
| TIMEFRAME | MONTHLY | $20.00 TO RIVAL ATHLETIC BOOSTERS | |

OVERRIDE AUTHORITY | | OVERRIDE FUNDS FILLED FROM: | |
---|---|---|---
ACCOUNT USER | YES  (NO) | NEXT ALLOTMENT | BUDGET/SAVINGS BUCKET
THIRD PARTY | (YES)  NO | BUCKET _______ |

AUTOMATIC BUDGETING SYSTEM

The following application claims priority to U.S. Provisional Patent Application Ser. No. 61/751,365 filed Jan. 11, 2013 entitled AUTOMATIC WEALTH BUDGET. The above-identified application is incorporated herein by reference in its entirety for all purposes.

TECHNICAL FIELDS

The present invention relates generally to the field of budgetary tools, and more particularly to systems and methods for setting spending limits and savings goals for individual accounts, and tools to ensure compliance thereof.

BACKGROUND

Consumers often have difficulty managing their spending. The shift from the use of currency to innovative financial tools, such as credit and debit cards, online payment systems, direct account withdrawals, etc., makes it increasingly difficult for individuals to maintain a strong grasp over their spending habits and ensure they are meeting their savings goals. It becomes increasingly helpful for individuals to set rules in advance of making spending decisions in order to ensure compliance with sound financial management strategies while meeting long-term budgetary goals.

SUMMARY

A system and method is provided for an automatic budgeting system. The system comprises a software application to provide financial planning tools for individuals who desire to improve their financial situation.

In one example, a software application contains instructions to receive an identifier associated with an item to be purchased by a user. The software application provides the identifier associated with the item to an associated database. The item is then assigned a classification which, along with the price of the item, is provided to an authorization entity associated with at least one account of the user. A notice is then received as to whether a purchase of the item using the account will be authorized at the time of purchase. The authorization is determined as a function of the price of the item and the classification of the item.

DETAILED DESCRIPTION

Definitions

ACCOUNT USER: A typical account user is an individual who seeks to take steps to improve their financial situation. In some implementations, the user can also be an administrator. For example, where the automatic budget system is a personal account, the administrator configuring the automatic budget system may be the account user.

AUTHORIZATION ENTITY: An authorization entity collects item classification and price and determines whether or not the particular purchase falls within the scope of the purchase authority of the user. If the purchase is authorized, the authorization entity sends a request for allowance. If the purchase is rejected, the authorization entity sends a notice to that effect and queries the system whether an override is available.

THIRD PARTY ACCOUNT AUTHORITY: A third party account authority is one other than the account user who has privileges that allow him or her to define rules governing the automatic budget system, serving as an account administrator. The automatic budget system contemplates a variety of applications where an administrator's role would be defined in accordance with the relationship with the user as well as the desired goal for the particular account user. An administrator has privileged access to the program engine that includes several features that aid the administrator in configuring the account rules. An administrator may be a spouse, parent, business partner, trustee, or other individual or organization defining rules for the automatic budget system intended for the benefit of the user.

RULES: An authorized party may define one or more rules to govern one or more aspects of the automatic budgeting system. The rules can define actions taken by the system upon receiving a purchase request, such as limit the user's access to accounts, limit the scope of authority to make purchases, or make automatic allocations.

Figure 1:
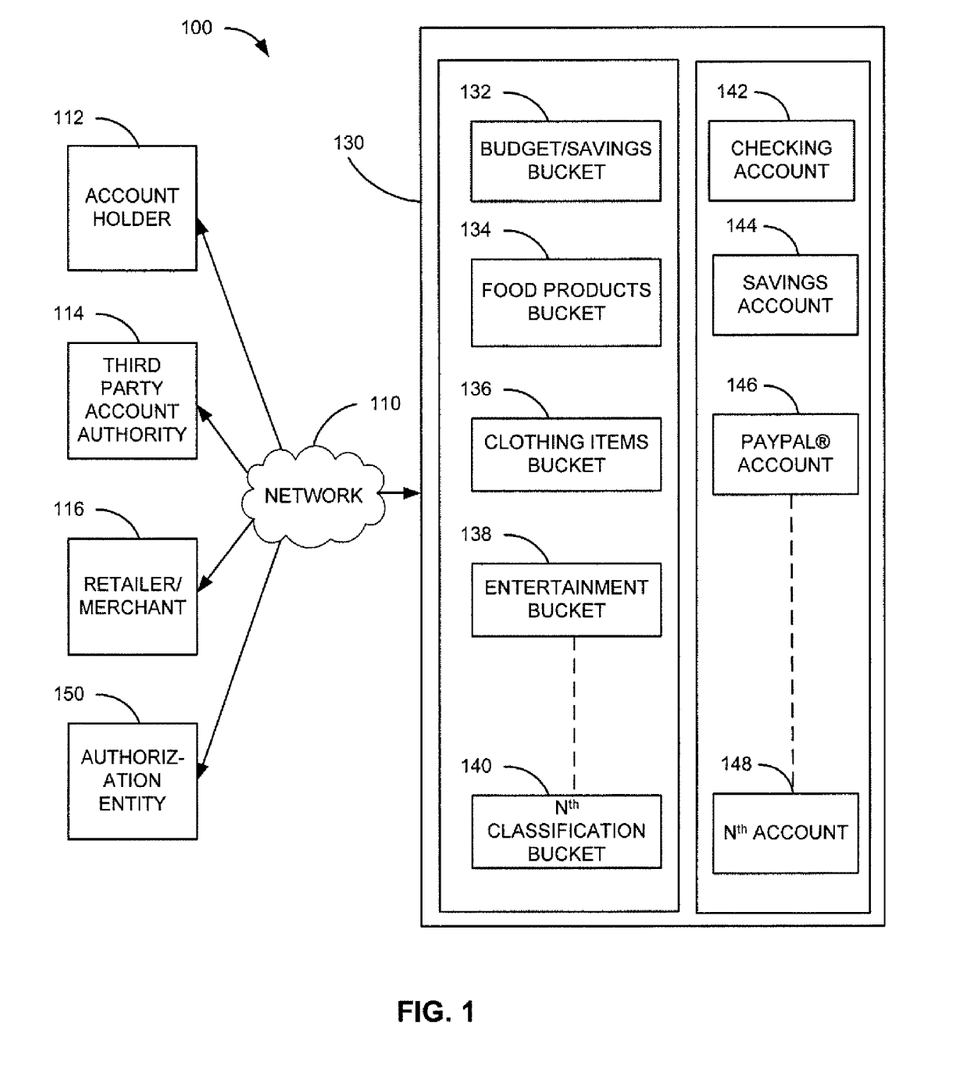
FIG. 1 illustrates an example of the automatic budgeting system in accordance with an aspect of the invention.

FIG. 1 illustrates an example of an automatic budgeting system 100 in accordance with an aspect of the invention. The automatic budgeting system is designed to provide financial planning tools for individuals who desire to improve their financial situation. The automatic budgeting system provides users the ability to set financial goals and spending restrictions based on a variety of rules, including but not limited to, a specific purchase, retailer, time frame, income earnings, etc. In addition to allowing the user to track purchase history, the ability to complete purchase transactions is restricted by spending limits on the above mentioned classifications. Specifically, the price and identity of a good may be captured by a mobile device of the user and matched against an associated database in order to determine if the cost of the good is within the associated category's budget limit for a given time frame.

The account holder may access the system from any device capable of displaying information and providing inputs, typically a computer, including but not limited to a smart phone, computer, tablet computer, or other appropriate computing platform. The user interface may include information relating to the individual account holder, such as spending history, progress updates towards reaching assigned goals, balance remaining in each or specific buckets, any savings provided through use of the system, and details surrounding a rejected purchase. The user interface will also include links to the rules engine in order to review and possibly modify rules depending on the user's authority.

Figure 2:
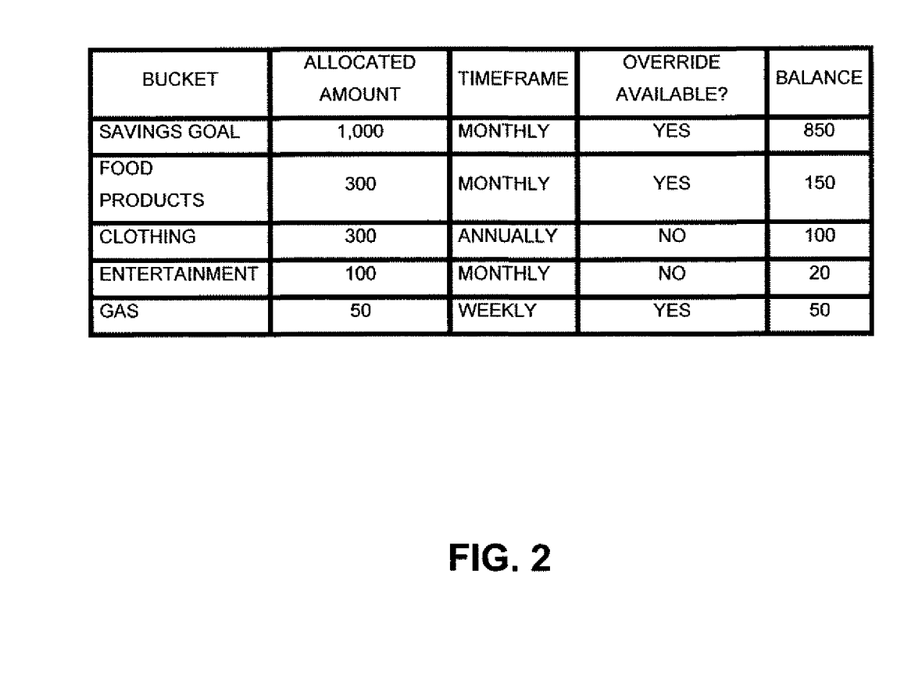
FIG. 2 illustrates an example of a graphical interface for defining limits for various budgetary categories in accordance with an aspect of the invention.
Figure 3:
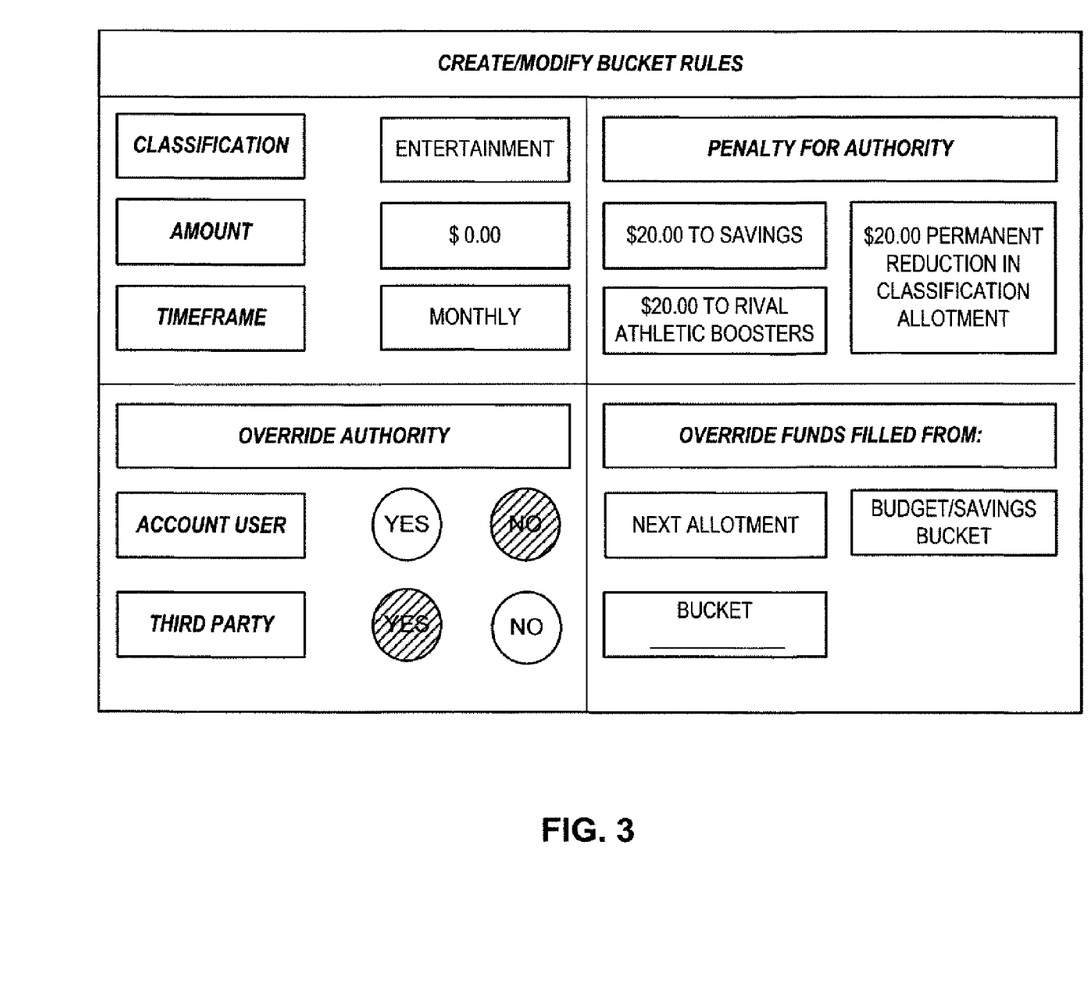
FIG. 3 illustrates an example of a graphical interface for creating and modifying rules in accordance with an aspect of the invention.

The automatic budgeting system 100 includes an account holder 112, a third party account authority 114, a retailer/merchant 116, a network 110, and an account 130. The account 130 contains a number of accounts databases 132-140, each with a unique classification and governed by a set of rules. Also contemplated is where the classifications are further divided into one or more sub-classes (not shown). In advance of a purchase, an account holder 112 or a third party account authority 114 may establish rules by which interactions between the purchaser and a retailer/merchant 116, as illustrated in FIGS. 2 and 3. The third party account authority 114 may also have the authority to override purchase limitations when a parameter is exceeded. The third party account authority 114 can include, for example, a parent, spouse, employer, trustee, or other responsible party.

The account databases 132-140 are each linked with at least one account of the account user. The accounts represent the user's available payment methods, be it credit cards, checking or savings accounts, a PayPal® account, merchant cards, or other accounts accessible to the user for making purchases. Preferably, but not necessarily, each account will be linked to each database. This would ensure that each budget limitation is applied equally to every account associated with the system.

In accordance with an aspect of the present invention, the account holder can provide an item identifier to the system, either as a purchase request or to query the system in anticipation of a purchase at a retailer/merchant 116. Typically a purchase request through a merchant involves scanning an item for purchase then sending an authorization request to the account. In the alternative, the user can obtain an identifier by scanning a bar code, Quick Response (QR) code, by photo capture, use of an RFID reader, inputting a text description, selecting an item from a digital format, such as a website, from a mobile device plug-in or adapter, or other methods suitable to provide specific item identification to the system. The user can use any networked computing platform capable of capturing data and uploading information to the account. Upon upload of the item identifier, the software application provides the identifier associated with the item to an associated database. The database contains information from merchants, suppliers, manufacturers and the like to identify a variety of items. If an item is not recognized by an existing database, the user may assign the item an identifier, or a default identifier can be assigned items not recognized.

At this point, information pertaining to the identity of the item as well as price is uploaded to the account 130. The account holder 112 then assigns the item a classification based upon the information stored in one or more associated databases. Items are classified based on the type of merchant or item, or the function of the item. For example, a merchant may be a grocers, clothier, or electronics seller; an item may be milk, a sweater, or a video game; and a function may be food products, clothing, or entertainment. If an item identifier fails to associate the item with one or more classifications, the user may assign classifications to the item. In the alternative, the user may have authority to override a default classification in order to move an item from one classification to a classification that more appropriately suits the account user's financial goals.

Classifications can be defined by the system, which will typically include default classifications of items. Individual items may also be assigned multiple classifications. For example, milk may be in a broad category of "food product," as well as more specific categories such as "dairy products." Further, milk may by default be classified as provided by a grocer. Classifications may also be tailored to meet a specific requirement of the account holder. To continue with the example, milk may be classified by the account holder as a product that has no spending limit or time frame restrictions, provided the account contains funds to cover the cost of the purchase.

Once assigned, the item classification and price are provided to an authorization entity 150 associated with at least one account of the user. The authorization entity 150 determines whether a proposed purchase or inquiry is within a set of defined account rules. Account rules may include spending limits based on available funds, time frame, item classification, or other parameter that furthers the account user's financial goals. Authorization is determined as a function of the price of the item and the classification of the item. Account rules are described in greater detail below.

The authorization entity 150 then provides notice as to whether a purchase of the item using the account will be authorized at the time of purchase based on the authorization entity determination. If the proposed purchase falls within the account rules, the purchase will be authorized and allowed to proceed. If the proposed purchase falls outside one or more of the account rules, a notification is sent to a decision engine to determine actions to take in accordance with a set of rules. It will be appreciated that, while account rules are generally related to purchases, other rules can be placed on the account using the capabilities of the user's mobile device. For example, a global positioning system (GPS) receiver or other location service associated with the mobile device can be used to continuously track the user's location. The user or the third party account authority 114 can establish one or more "restricted zones," such that the user incurs some form of penalty upon entering a defined zone or spending time in a zone beyond a threshold value. It will be appreciated that the restricted zones can be defined in time as well as geographic extent, such that a given location may be forbidden at a first time or on a first day, but allowed for a different time or day. In one example, the zones can include establishments likely to provoke excessive or unproductive spending. To this end, the zones can be defined categorically, such that any location recognized as falling within a given category, such as "electronics store", "bar", or "casino", can be automatically defined as restricted. Appropriate penalties can include notification of the third party account authority 114 or other third party, publication of the user's entrance into the zone on a social media site, or refusal of all purchases attempted while within the zone.

Violation of the rules can result in a variety of actions, based on the particular parameter left unmet, by specific rules set by the account user or administrator, or by system default rules. An account user and an administrator may have authority to define account rules. Account rules may include assigning specific spending limits on a classification of goods and services, the time frame in which a specific amount may be spent, based on the proportion of total balance in savings, historical spending habits, seasonal requirements, etc. Additional limitations can be set, such as a block on a particular account or a freeze on purchases within a particular class. In the alternative, an authorized party may lift a limitation to allow a purchase that would normally be rejected. Default rules may reject, for example, a purchase due to total insufficient funds, or the purchase of an adult item to a minor cardholder.

In one implementation, when the system is notified that a requested purchase exceeds a designated parameter, several actions are considered. Immediately, the purchaser will receive a warning that the purchase is barred from going forward and notification as to what parameter is violated. If the account is subject to an account care taker, the care taker will also receive notification that a purchase is being denied. The system can also respond in a variety of ways depending on the associated rules as designated by an authorized party. The rules may be configured as an absolute block to certain purchases, such as ones exceeding a spending limit or for a prohibited class of goods. Accordingly, the system would send notification that the purchase will not be allowed. Depending on the established rules, the purchaser may be able to override the rejection. For example, the purchaser may be able to designate the purchase as an emergency, whereby funds may shift from an appropriately identified bucket. Additionally, the purchaser may have account rights that allow discretion to borrow from future purchases or other buckets.

If the account is subject to an account care taker, the purchaser may not have authority to allow purchases that run afoul of certain rules. Accordingly, any purchase that exceeds predetermined rules must be authorized by the third party account authority 114. For example, if a minor card holder attempts to make a video game purchase that exceeds the spending limit on the entertainment budget, it would be refused and notification of the attempted purchase would go to the account care taker. At this point, the authorized party 114 can either sustain the rejection or remove the limitation. Removing the limitation may be appropriate if, say, the minor card holder was being rewarded for good grades and the account care taker chooses to allow the purchase.

If the user has the authority to override a purchase, the rules may dictate a certain response meant to discourage violating the spending and savings plan. The rules may be set to different levels of severity depending on the class of good, time frame, or other appropriate measure. For example, if a user acts to override a purchase, the system may decrease the amount of funds for the bucket in the next allocation, require a penalty payment to a savings fund, shift funds from one bucket to another to make up for the additional cost, or send notification to a third party. However, the user may set a less severe penalty for the override of certain purchases. Overriding a spending limit on car repairs, for example, may yield a less severe penalty than that for video games.

FIG. 2 shows a screen shot of the bucket designations that correspond to the account databases 132-140, with information pertaining to the rules and balances assigned titles to each bucket. Each individual bucket has an independent limit for a specific good or class of goods found on an associated purchase database for an associated time frame (e.g., daily, weekly, biweekly, monthly, quarterly, or annually). This independent limit serves as an automatic block on the purchase, regardless of the funds in the general or aggregate account. Each account can also be configured to have an override available for the account, such that the user could continue with a purchase even if the funds for the associated class of good have been exhausted for a given time frame. It will be appreciated that an override can be conditional and require either a third party authorization or some form of penalty, such as notification of one or more individuals of the purchase or current or future deductions from other discretionary buckets (e.g., entertainment).

In a typical shopping experience, the individual may have several items for purchase compiled for a single bill. In this example, assume there are three items that fit in one of the following categories: food, clothing and entertainment. The purchase items would be categorized and matched to an appropriate class of goods on the purchaser's account database. Assume the total cost of the three items does not exceed available funds, thus no "over limit" restriction is applied. However, each of the three categories has an individual spending limit that is recognized as distinct by the account or accounts being accessed for the purchase. In this example, assume the food and clothing budget for the time frame has not been exceeded. Those purchases would elicit no warning from the account.

However, assume the entertainment purchase would exceed the entertainment budget. In addition to a warning from the account, the purchase would be denied outright based on the specific budget allocation to the entertainment category. This would be despite the fact that the account has funds in excess of the total amount of the purchase. Further, the purchaser would typically not have authority to override a purchase rejection based on exceeding funds allocated to a specific category or bucket. In this case, the entertainment item would have to be removed from the purchase, scaled back to fit within the allocated budget, or, in the alternative, a third party with authorization privileges may allow the purchase of the item. An override would borrow funds from a later allotment or from another bucket. Depending on the designated rules, a penalty may be applied if an override is authorized.

Alternatively or additionally, if an override is requested, the system can calculate any additional charges associated with violation of the rules. For example, if the purchase in question is to be made using credit, a calculation of monthly interest charges can be sent to the user prior to authorization. Also, if a penalty is to be applied, the amount to be penalized, the account from which the penalty is to be paid, and to what end the penalty is disbursed (e.g., rival sports team's boosters, a caretaker, charity, etc.). If the penalty funds are removed from an interest bearing account, the lost interest due to the removal of the funds to cover the purchase override can also be calculated and provided to the user. Further, if the override would remove funds allocated for a particular savings goal (e.g., a vacation fund), an alert to that effect would be provided as well. As such, the user is given a more complete picture of how violating specific account rules will impact direct as well as ancillary account maintenance.

FIG. 3 illustrates a user interface for creating and modifying rules for specific buckets. In this example, the allocated amount can be set, along with the allotment time frame and override authority. The balance would update automatically when connected to the system reflecting current purchase history. It should be noted that, although the user may have access to view detailed account information, only account users and third parties with administrative rights will be allowed to modify the rules that govern the account. Associated with the override authority is how an override disbursement is budgeted for, as described with greater detail in FIG. 5. Here, the rules can shift funds authorized beyond the allocated amount to the deficient bucket from the next scheduled allotment, from the budget/savings bucket, or from a bucket of the administrator's choosing.

Also displayed in FIG. 3 is a set of penalty options meant to encourage compliance with predetermined goals. A penalty is applied when an override is authorized. The party creating and modifying the rules can make a penalty more or less severe, depending on the particular classification of items and savings goal. For example, in addition to borrowing from next month's allocation, say, a mild penalty may be reducing the next month's allocation by $20, which would then be deposited into savings. A more severe penalty may be sending an automatic payment to a third party, such as a spouse, charitable organization, or even an organization that the user would rather not support, such as a rival athletic team's booster organization. Additional penalties can include a permanent reduction in future allotments for the particular bucket, or loss of override authority, if, for example, a user with the authority to override a rejection abuses such authority.

Figure 4:
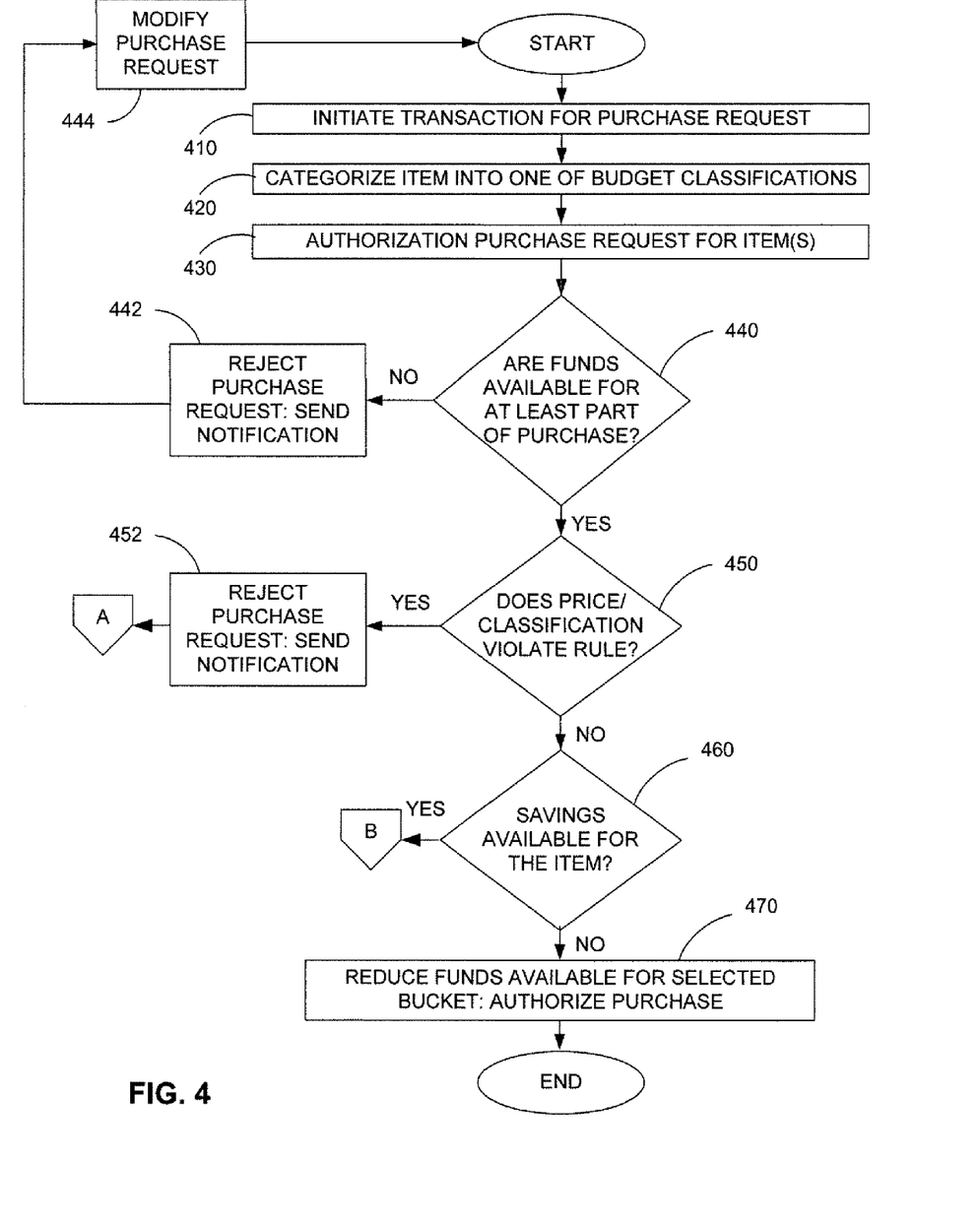
FIG. 4 illustrates an example of a method for initiating a purchase in accordance with an aspect of the invention.

FIG. 4 is directed to a typical transaction involving the automatic budgeting system. At 410, the user would scan an item for purchase and provide a method of payment linked to an account, thereby submitting the item identifier and price to the associated account databases. The item is then identified and categorized into one or more budget classifications, as shown in 420. The price and the classification are then subjected to authorization entity 430. At decision point 440, the system determines whether or not funds are available for at least a portion of the purchase request. If funds are not available, a notification rejecting the purchase request is sent at 442. At that point, the user may modify the purchase request at 444, by choosing a less expensive item, and begin again. If funds are available, the purchase request proceeds to the authorization entity to determine if the price and classification violate one or more rules associated with the classification, 450.

If a rule is violated by the purchase request, a notification is sent to the user that the purchase has been rejected at 452, and the purchase is analyzed to determine if override authority is available. Moreover, the request to override a purchase rejection may be processed to ensure the individual requesting an override is authorized to do so. For example, a criminal may attempt to use a stolen credit card in order to carry out an unauthorized purchase. Software and/or services directed to identity and fiscal protection may be applied to the request. This application would ensure that the individual making the request is authorized to use the account and authorized to request an override. Additionally, the system can check with the issuing bank or credit authority to ensure that the credit or bank card has not been reported as stolen or intentionally deactivated.

Figure 5:
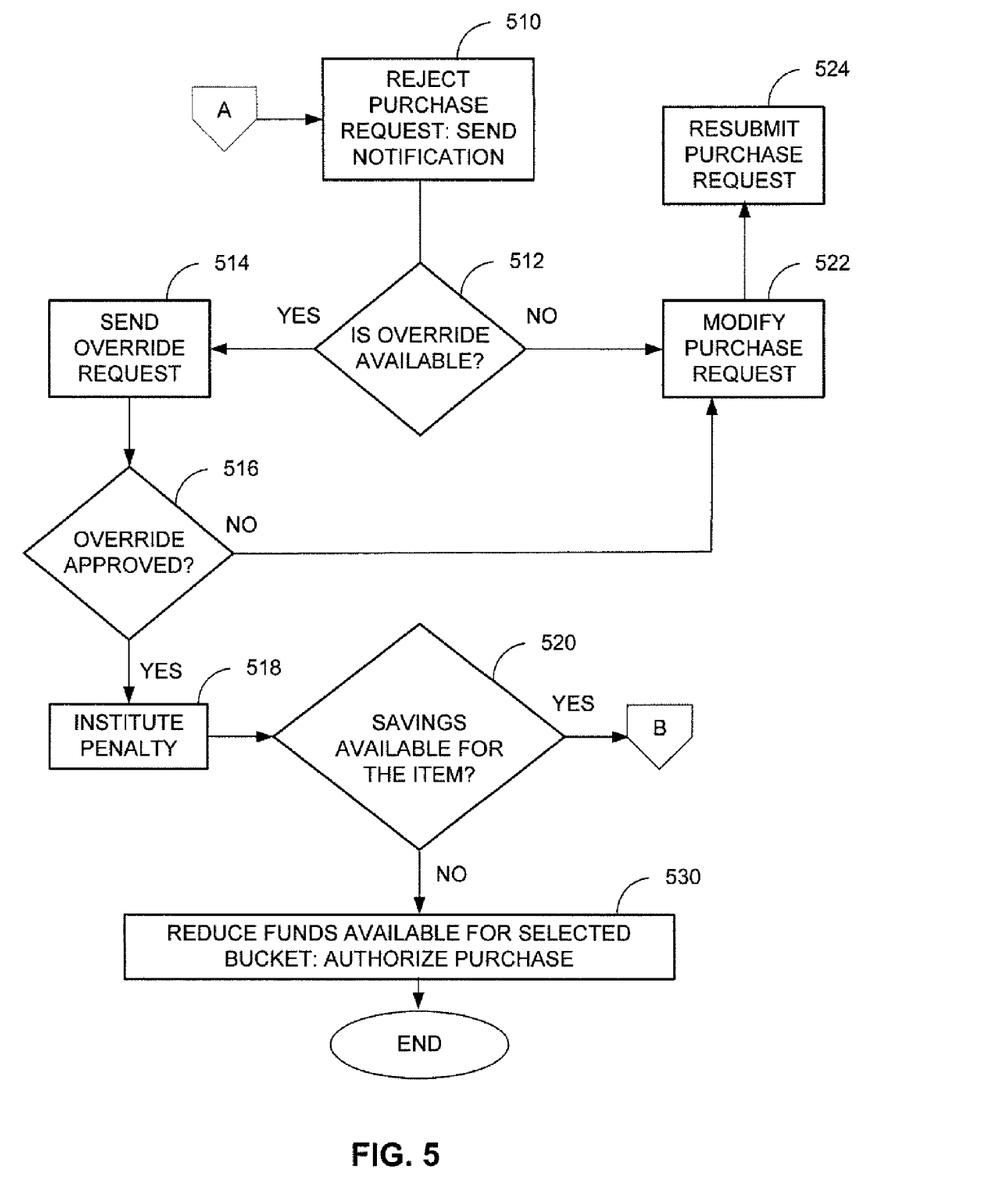
FIG. 5 illustrates an example of a method for overriding purchase rejections in accordance with an aspect of the invention.

FIG. 5 illustrates an example of a method for handling rejected purchases in accordance with an aspect of the invention. At 510, the rejected purchase request is then analyzed as to whether override authority is available for the classification. If override is unavailable, the user is limited to modifying the purchase request at 522, and resubmitting the purchase request at 524. If override is available, an override request is sent at 514. Depending on the rules governing the particular classification, it is determined at the override request may go to the user or an authorized third party for a determination, and the authorized party determines if the override will be permitted at 516. If the override is not approved, the user is limited to modifying the purchase request at 522, and resubmitting the purchase request at 524. If the override request is approved, the system determines the penalty associated with the override at 518. After the penalty is applied, the purchase is approved, and proceeds to determine what savings are available before funds are released for purchase at 520. If savings are available, the method continues to FIG. 6, as described in detail below. If no savings are recognized, the purchase is authorized, and the funds required for the purchase are removed from the bucket associated with the purchase at 520.

Returning to FIG. 4, if it is determined that no rule is violated at 450, the system determines whether or not any savings are associated with the purchase at 460. Savings can be defined as any discount recognized by the budget tool. When a price and item are uploaded to the system for analysis, the expected price upon which the initial authorization is based may prove different then the price eventually paid for the item. For example, at the point of sale a particular store or manufacturer may offer a coupon for the item that provides immediate cost savings. The difference between the amount budgeted for the particular item and the discount received may be recognized by the budget tool as a savings allocated for return to the system. Savings are typically deposited into a bucket designated as a savings account.

Additional scenarios are contemplated where a discount returns a savings to the system. Upon upload, the system may search loyalty programs associated with the account. If the loyalty program has deals, specials or partner programs associated with the item that would benefit the user, a notification may be sent to the user to modify purchases. For example, the loyalty program may suggest the item in question is to go on sale soon, that the item has a promotion attached to it, or that a complementary product is offering an attractive deal. In similar fashion, the system may search the Internet for the identical or like items offered by competitors. The user may then decide to purchase from the competitor or insist on price-matching from the merchant. The same search function may contact discounted coupon sites for deals negotiated by third parties. As the user is notified of competing products as well as prices and deals offered by competitor's the user makes a more informed purchase, has opportunity to reap considerable savings, and avoids the prospect of finding identical items offered elsewhere or shortly thereafter at a discount.

If no savings are recognized, the purchase is authorized, and the funds required for the purchase are removed from the bucket associated with the purchase at 470. If savings are determined to be available at either of decision point 520 of FIG. 5 or decision point 460 of FIG. 4, the savings are allocated according to the method of FIG. 6. At 610, the system determines the source of the savings, for example a manufacturer's coupon. At 620, the system calculates the amount of savings offered by the coupon. As the full cost of the item was submitted for approval, the full amount of the item is available for disbursement. Thus, the system siphons the savings offered by the coupon and places the funds into a designated bucket at 630. The remaining amount required for the purchase is then disbursed to complete the purchase at 640. A notification of the savings is then sent to the user at 650.

Figure 6:
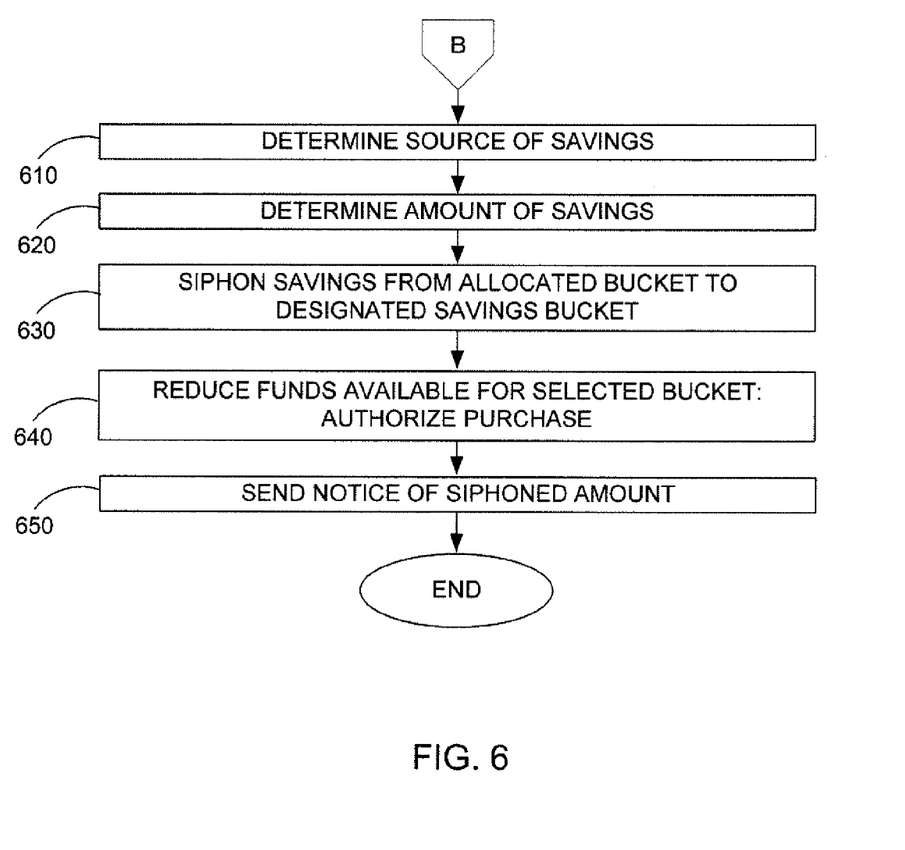
FIG. 6 illustrates an example of a method for determining savings associated with a purchase in accordance with an aspect of the invention.

It is to be understood, however, that the automatic budgeting system 300 is not limited to the examples of FIGS. 4-6, but that any suitable sequence may be implemented in accordance with varying rules and content as chosen by the account holder. Further, the sequence illustrated in FIGS. 4-6 follow only one series of method steps in a particular order, whereas the sequence may be modified by the account holder according to the particular goal to be achieved.

Figure 7:
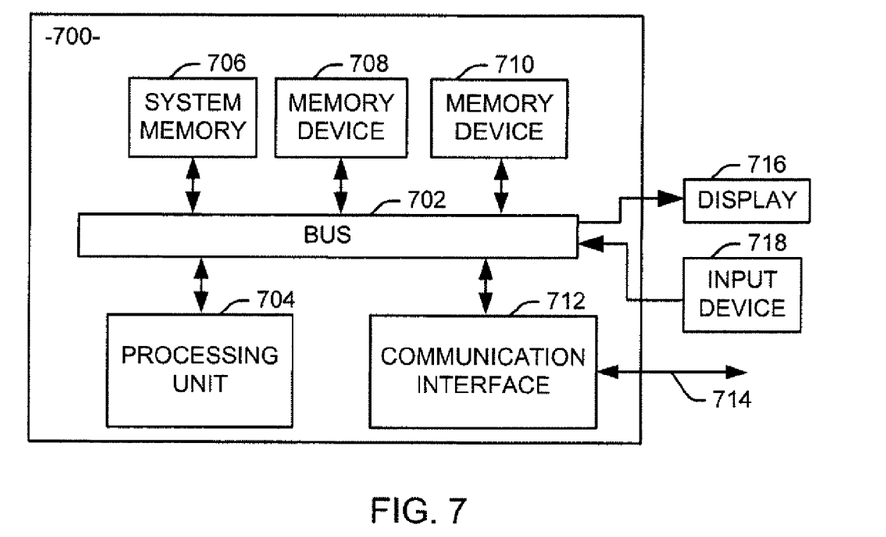
FIG. 7 is a schematic block diagram illustrating an exemplary system of hardware components capable of implementing examples of the present disclosed in FIGS. 1-6, such as the automatic budget system illustrated in FIG. 1.

FIG. 7 is a schematic block diagram illustrating an exemplary system 700 of hardware components capable of implementing examples of the present invention disclosed in FIGS. 1-6, such as the automatic budgeting system illustrated in FIG. 1. The system 700 can include various systems and subsystems. The system 700 can be, for example, a mobile computing device, a personal computer, a laptop computer, a workstation, a computer system, an appliance, an application-specific integrated circuit (ASIC), a server, a server blade center, a server farm, or a similar device.

The system 700 can include a system bus 702, a processing unit 704, a system memory 706, memory devices 708 and 710, a communication interface 712 (e.g., a network interface), a communication link 714, a display 716 (e.g., a-video screen), and an input device 718 (e.g., a keyboard and/or a mouse). The system bus 702 can be in communication with the processing unit 704 and the system memory 706. The additional memory devices 708 and 710, such as a hard disk drive, server, stand alone database, or other non-volatile memory, can also be in communication with the system bus 702. The system bus 702 interconnects the processing unit 704, the memory devices 706-710, the communication interface 712, the display 616, and the input device 718. In some examples, the system bus 702 also interconnects an additional port (not shown), such as a universal serial bus (USB) port. The processing unit 704 can be a computing device and can include an application-specific integrated circuit (ASIC). The processing unit 704 executes a set of instructions to implement the operations of examples disclosed herein. The processing unit 704 can include a processing core.

The additional memory devices 706, 708 and 710 can store data, programs, instructions, database queries in text or compiled form, and any other information that can be needed to operate a computer. The memories 706, 708 and 710 can be implemented as non-transitory computer-readable media (integrated or removable) such as a memory card, disk drive, compact disk (CD), or server accessible over a network. In certain examples, the memories 706, 708 and 710 can store text, images, video, and/or audio, along with appropriate instructions to make the stored data available at an associated display 716 in a human comprehensible form. Additionally, the memory devices 708 and 710 can serve as databases or data storage for the interactive overlay system illustrated in FIG. 1. Additionally or alternatively, the system 700 can access an external data source through the communication interface 712, which can communicate with the system bus 702 and the communication link 714.

In operation, the system 700 can be used to implement a control system for an automatic budgeting system that governs the interaction between the administrator and account holder. Computer executable logic for implementing the automatic budgeting system resides on one or more of the system memory 706 and the memory devices 708, 710 in accordance with certain examples. The processing unit 704 executes one or more computer executable instructions originating from the system memory 706 and the memory devices 708 and 710. The term "computer readable medium" as used herein refers to a medium that participates in providing instructions to the processing unit 704 for execution, and can include multiple physical memory components linked to the processor via appropriate data connections.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for budget management via a mobile device, the method comprising:
capturing an identifier associated with an item to be purchased at via the mobile device at one of a camera of the device and an radio frequency identification reader;
transmitting the identifier associated with the item to be purchased from the mobile device to an associated database, the database storing identifiers for a plurality of items and at least one associated classification for each of the plurality of items;
transmitting each of a classification of the item and a price of the item to an authorization entity associated with at least one account of the user, the authorization entity storing a plurality of account rules defined by a user;
transmitting, at the time of inquiry, a notice whether a purchase of the item using the at least one account will be authorized at a point of sale from the authorization entity to the mobile device, the authorization being determined automatically by the authorization entity as a function of the price of the item, the account rules, and the classification of the item, and the notice indicating that the authorization entity has determined that the purchase will not be authorized;
transmitting a request from the mobile device to the authorization entity for an override of the rejected purchase;
receiving an authorized override response from the authorization entity to override the determination that the purchase will not be authorized; and
automatically posting a notice to a social media account that an unauthorized purchase has been made.

2. The method of claim 1, the method further comprising receiving an identifier for a savings associated with the item, wherein, upon application of the savings to the purchase of the item, an amount of the purchase absent the savings is deducted from an account associated with the classification of the item and an amount of the savings is deposited into another account associated with the user.

3. The method of claim 1, the method further comprising:
defining at least one geographic zone at the mobile device;
tracking a location of the user using a location service associated with the mobile device; and
notifying a third party if the user enters the defined geographic zone.

4. The method of claim 3, wherein the defined geographic zone is designated as a restricted zone, wherein the authorization of an item to be purchased is at least one of limited and precluded while the mobile device is located within the restricted zone.

5. A method for budget management via a mobile device, the method comprising:
capturing an identifier associated with an item to be purchased at via the mobile device at one of a camera of the device and an radio frequency identification reader;
transmitting the identifier associated with the item to be purchased from the mobile device
to an associated database, the database storing identifiers for a plurality of items and at least one associated classification for each of the plurality of items;
transmitting each of a classification of the item and a price of the item to an authorization entity associated with at least one account of the user, the authorization entity storing a plurality of account rules defined by a user; and
transmitting data representing a savings associated with the item from the authorization system to the mobile device, the savings being determined automatically from the classification of the item and a price of the item, wherein the savings identifies one of a lower cost for a complimentary item and a pending future sale for the item.

6. The method of claim 5, wherein the authorization entity is unable to identify the item to be purchased and information associated with the item is sent to an authorized user to assign a classification to the item.

7. The method of claim 5, wherein the item to be purchased is assigned at least two classifiers, wherein one of the two classifiers is provided a greater weight in determining an authorization of the item to be purchased.

8. The method of claim 7, further comprising:
requesting an authorized user to override a determination to not authorize a purchase request; wherein the authorized user has authority to override a determination to not authorize a purchase based on a first classification but lacks authority to override a determination to not authorize a purchase based on a second classification.

9. The method of claim 5, further comprising allowing an authorized user to modify a default classification for an item to be purchased.

10. The method of claim 5, further comprising:
receiving, at the time of inquiry, a notice whether a purchase of the item using the at least one account will be authorized, the authorization being determined as a function of the price of the item and the classification of the item.

11. The method of claim 5, further comprising:
receiving a request for an emergency override, wherein the emergency override allows a purchase of an item that has been determined to be not authorized to be authorized resulting in at least one of a notification to a third party, a penalty, and shifting of funds from one account to another.

12. A method for budget management via a mobile device, comprising:
capturing an identifier associated with an item to be purchased at via a mobile device at one of a camera of the mobile device and an radio frequency identification reader;
transmitting the identifier associated with the item to be purchased from the mobile device to an associated database, the database storing identifiers for a plurality of items and at least one associated classification for each of the plurality of items;
transmitting each of a classification of the item and a price of the item to an authorization entity associated with at least one account of the user, the authorization entity storing a plurality of account rules defined by a user;
transmitting, at the time of inquiry, a notice that the authorization entity determines the purchase will not be authorized from the authorization entity to the mobile device, the authorization being determined automatically by the authorization entity as a function of the price of the item, the account rules, and the classification of the item;
transmitting a request from the mobile device to the authorization entity for an override of the rejected purchase;
receiving an authorized override response from the authorization entity at the mobile device to override the determination that the purchase will not be authorized; and
automatically imposing a penalty against the account at the authorization entity based on the account rules and at least the classification and price associated with the item.

\* \* \* \* \*